(12) United States Patent
Eichenberger

(10) Patent No.: US 9,630,442 B2
(45) Date of Patent: Apr. 25, 2017

(54) SECURITY SYSTEM WITH OPTICAL WAVEGUIDE

(71) Applicant: ORELL FÜSSLI SICHERHEITSDRUCK AG, Zürich (CH)

(72) Inventor: Martin Eichenberger, Zollikon (CH)

(73) Assignee: ORELL FUSSLI SICHERHEITSDRUCK AG, Zurich (CH)

( * ) Notice: Subject to any disclaimer, the term of this patent is extended or adjusted under 35 U.S.C. 154(b) by 75 days.

(21) Appl. No.: 14/612,741

(22) Filed: Feb. 3, 2015

(65) Prior Publication Data

US 2015/0145239 A1  May 28, 2015

Related U.S. Application Data

(62) Division of application No. 13/516,267, filed as application No. PCT/CH2009/000405 on Dec. 18, 2009, now abandoned.

(51) Int. Cl.
| | |
|---|---|
| *B42D 25/00* | (2014.01) |
| *B42D 25/29* | (2014.01) |
| *B42D 25/328* | (2014.01) |
| *B42D 25/21* | (2014.01) |
| *B42D 25/355* | (2014.01) |
| *B42D 25/36* | (2014.01) |
| *B42D 25/324* | (2014.01) |

(Continued)

(52) U.S. Cl.
CPC ........... *B42D 25/328* (2014.10); *B42D 25/00* (2014.10); *B42D 25/21* (2014.10); *B42D 25/29* (2014.10); *B42D 25/324* (2014.10); *B42D 25/346* (2014.10); *B42D 25/351* (2014.10); *B42D 25/355* (2014.10); *B42D 25/36* (2014.10); *G02B 6/34* (2013.01)

(58) Field of Classification Search
None
See application file for complete search history.

(56) References Cited

U.S. PATENT DOCUMENTS

| | | | |
|---|---|---|---|
| 5,448,659 A | | 9/1995 | Tsutsui et al. |
| 5,465,311 A | * | 11/1995 | Caulfield ................. G02B 6/43 359/34 |

(Continued)

FOREIGN PATENT DOCUMENTS

| | | |
|---|---|---|
| CA | 2 238 284 C | 8/2006 |
| CA | 2 591 982 A1 | 6/2007 |

(Continued)

OTHER PUBLICATIONS

International Preliminary Report on Patentability dated Jun. 28, 2012 for International Application No. PCT/CH2009/000405.

(Continued)

*Primary Examiner* — Kyle Grabowski
(74) *Attorney, Agent, or Firm* — Ladas & Parry LLP

(57) ABSTRACT

A security document comprises a substrate (1) and an optical waveguide (7). Couplers (10a, 10b) are provided in the waveguide (7) for coupling light into and out of the waveguide. The couplers (10a, 10b) can e.g. by gratings, scattering objects, holograms, luminescent dyes or perforations. The authenticity of the document can be verified using methods based on the properties of the waveguide.

16 Claims, 2 Drawing Sheets

(51) Int. Cl.
*B42D 25/351* (2014.01)
*B42D 25/346* (2014.01)
*G02B 6/34* (2006.01)

(56) References Cited

U.S. PATENT DOCUMENTS

| | | | |
|---|---|---|---|
| 5,907,160 | A | 5/1999 | Wilson et al. |
| 6,234,537 | B1 | 5/2001 | Gutmann et al. |
| 2005/0116048 | A1 | 6/2005 | Sauter et al. |
| 2005/0150740 | A1 | 7/2005 | Finkenzeller et al. |
| 2006/0006236 | A1 | 1/2006 | Von Fellenberg et al. |
| 2006/0198987 | A1* | 9/2006 | Grob ............ B42D 25/29 428/137 |
| 2008/0019652 | A1 | 1/2008 | Steenblik et al. |
| 2008/0164690 | A1 | 7/2008 | Heierli et al. |
| 2008/0169639 | A1* | 7/2008 | Eichenberger ...... B42D 25/29 283/85 |
| 2009/0103150 | A1 | 4/2009 | Heierli et al. |
| 2010/0112458 | A1 | 5/2010 | Knocke |
| 2013/0154250 | A1* | 6/2013 | Dunn ............ B42D 15/00 283/85 |
| 2015/0001840 | A1* | 1/2015 | Parker ........... B42D 25/29 283/85 |

FOREIGN PATENT DOCUMENTS

| | | |
|---|---|---|
| CN | 101443692 A | 5/2009 |
| DE | 10 2008 033 716 B3 | 9/2009 |
| EP | 2 000 321 A2 | 12/2008 |
| FR | 2 920 340 A1 | 3/2009 |
| JP | 3-62879 U | 6/1991 |
| JP | 6-314068 A | 11/1994 |
| JP | 2003-248414 A | 9/2003 |
| JP | 2004-77858 A | 3/2004 |
| JP | 3594886 B2 | 9/2004 |
| JP | 2007-203568 A | 8/2007 |
| WO | 97/19820 A1 | 6/1997 |
| WO | 03/098280 | 11/2003 |
| WO | 2004/011274 A1 | 2/2004 |
| WO | 2004/062942 A1 | 7/2004 |
| WO | 2004/097751 A2 | 11/2004 |
| WO | 2005/124456 A2 | 12/2005 |
| WO | 2006/056089 A2 | 6/2006 |
| WO | 2007/133613 A2 | 11/2007 |
| WO | 2009/053622 A2 | 4/2009 |

OTHER PUBLICATIONS

International Search Report dated Aug. 6, 2010 for International Application No. PCT/CH2009/000405.
Written Opinion of the International Searching Authority for International Application No. PCT/CH2009/000405.
Examiner's Report dated Dec. 19, 2013 for copending Singapore Application No. 201204486-3.
Examiner's Report dated Jan. 6, 2014 for Japanese Application No. 2012-543430.
European Search Report dated Apr. 23, 2014 for EP Application No. 14000556.2-1704.
First Office Action dated May 15, 2014 for Chinese Application No. 200980163367.2 with English translation.
Espacenet English abstract of EP 2 000 321 A2.
Espacenet English abstract of DE 10 2008 033 716 B3.
Espacenet English abstract of JP 2007-203568 A.
Espacenet English abstract of FR 2 920 340 A1.
Espacenet English abstract of JP 2003-248414 A.
Espacenet English abstract of JP 6-314068 A.
Espacenet English abstract of JP 2004-77858 A.
Espacenet English abstract of CN 101443692 A.
Examination Report dated Mar. 2, 2016 for Korean Application No. 10-2012-7018684 with English translation.
Korean Patent Abstracts English abstract of KR 10-2007-0086572.
Espacenet English abstract of JP 2002019338 A which corresponds to JP 3594886 B2.
Examination Report dated Jun. 30, 2015 for Australian Application No. 2009356927.

* cited by examiner

SECURITY SYSTEM WITH OPTICAL WAVEGUIDE

TECHNICAL FIELD

The invention relates to the field of security documents, such as banknotes, passports or credit cards.

BACKGROUND ART

Security documents have a substrate, which may be flexible, and on or in which there is arranged at least one security feature for the verification of the authenticity of the security document.

Volume or surface holograms or refractive gratings have, inter alia, been suggested as security features, in particular for bank notes, credit cards or passports. Even though such features are hard to counterfeit, they can be imitated if sufficient efforts are undertaken by a counterfeiter.

DISCLOSURE OF THE INVENTION

Hence, it is an object to provide a security document of the type mentioned initially that further improves counterfeiting security.

This object is achieved by a security document comprising a substrate and an optical waveguide arranged on and/or in said substrate. The waveguide comprises at least a coupler structured and adapted for coupling light into the waveguide and/or for coupling light out from the waveguide.

Since waveguides are generally difficult to manufacture, this measure increases security. The coupler allows to couple light into the waveguide or to observe light guided within the waveguide.

The waveguide can be an item separate from the substrate, for example if the substrate is formed by one or more sheets of paper. It can, however, also be part of the substrate, e.g. if the substrate is made from a transparent material, such as a polymer foil.

The document advantageously comprises a first and a second coupler. The two couplers are arranged and structured such that light coupled into the waveguide by means of the first coupler is at least partially transmitted to and coupled out by the second coupler. This makes it possible to operate and verify the waveguide by means of a light source and an observation means (such as a human eye or a detector) outside the waveguide.

Advantageously, the substrate is non-transparent (i.e. absorbing for the light guided in said waveguide) and has a window or half-window. At least one coupler is arranged in the window. This allows to easily observe light coupled out of the coupler and/or to easily couple light into the waveguide through the coupler, while most of the coupler can be protected by the substrate.

The substrate may also comprise two windows or half-windows, with the first coupler arranged in the first window or half-window and the second coupler arranged in the second window or half-window. The waveguide extends between the first and the second window. This design allows to couple light into the waveguide through one of the windows and observe the light coupled out from the waveguide through the second window.

In another advantageous embodiment, the document comprises a luminescent dye arranged in or on the waveguide, which dye is luminescent under irradiation of light, e.g. light guided by the waveguide, such that the dye can be used for visualizing the presence of light in the waveguide. Alternatively, the luminescent dye can emit light under irradiation by light shone onto the waveguide, with at least part of the emitted light then propagating along the waveguide to be coupled out elsewhere.

The waveguide can be embedded at least partially in the substrate, thereby making an exchange or removal more difficult.

If the waveguide comprises a first and a second layer, with the first layer having a refractive index higher than the second layer, the first layer can be used to guide the optical waves, while the second layer serves to isolate the guided wave from the surroundings. In particular, the second layer can be arranged between the first layer and the substrate, thereby preventing said wave to be absorbed or scattered by the substrate. Advantageously, the waveguide also comprises a third layer, again with the first layer having a higher refractive index than the third layer. The first layer is arranged between the second and the third layer, thereby isolating the wave guided in the first layer on both sides. This is particularly useful if the waveguide is embedded at least over part of its length in the substrate.

BRIEF DESCRIPTION OF THE DRAWINGS

The invention will be better understood and objects other than those set forth above will become apparent when consideration is given to the following detailed description. Such description makes reference to the annexed drawings, wherein.

Note: The figures are not to scale.

MODES FOR CARRYING OUT THE INVENTION

Definitions

The term "security document" encompasses any type of document that contains a security feature that makes it difficult to reproduce. Examples for security documents of this type are banknotes, passports, checks, stock certificates, tickets, credit cards, or ID cards.

The term "light" is to be understood as light having a wavelength in the infrared, visible or ultraviolet range. In an advantageous embodiment, the term "light" refers to visible light only.

An "optical waveguide" is a body of substantially transparent material able to guide the light due to an elevated refractive index as compared to its surroundings.

A "window" in the substrate describes a transparent region in an otherwise substantially non-transparent substrate. The window can be completely surrounded by the non-transparent substrate, or it can be located at an edge of the substrate.

A "half-window" in the substrate implies that the substrate comprises two non-transparent layers, with the waveguide embedded between them. A half-window is a region where an opening is formed in one of the layers, with the other layer remaining intact.

The term "non-transparent" substrate or layer is to be understood such that when the given substrate or layer is illuminated from its first side, it transmits less than 50% of the light to its second side. The rest of the light is either absorbed or scattered.

First Embodiment

Figure 1:
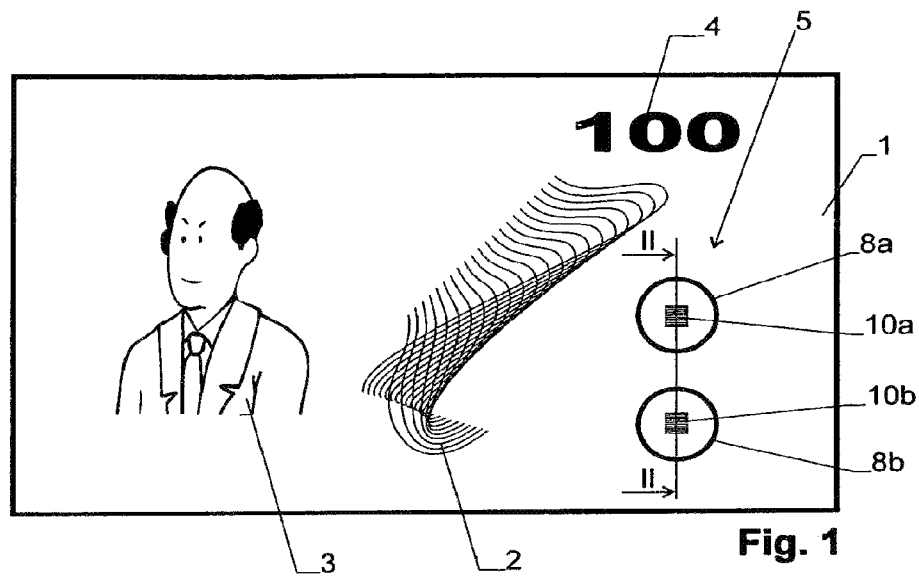
FIG. 1 is shows a first embodiment of a security document.
Figure 2:
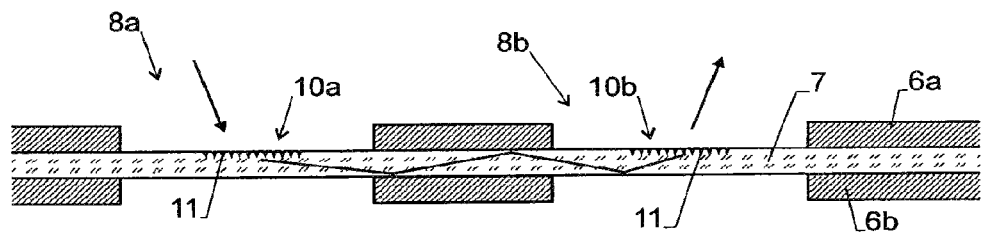
FIG. 2 shows a sectional view along line II-II of FIG. 1.

A first embodiment of the invention is shown in FIGS. 1 and 2, which shows a security document in the form of a banknote.

The shown security document comprises a flexible or rigid substrate 1 of paper or plastics, onto which graphical elements, for example in the shape of security designs 2, illustrations 3 and indications of value 4, are printed in known manner. In addition the document possesses a security feature 5, the design of which is described in the following.

In the embodiment of FIGS. 1 and 2, substrate 1 consist of a laminate of a first paper layer 6a, a second paper layer 6b, and a waveguide 7 in the form of a transparent plastics layer between them. The paper layers 6a, 6b are non-transparent. Two windows 8a, 8b are provided in substrate 1. They are formed by holes in the two paper layers 6a, 6b. Waveguide 7 extends through both of them.

At the location of the windows 8a, 8b, waveguide 7 is provided with a first and a second coupler 10a, 10b, respectively. The purpose of these couplers is to couple light into waveguide 7 and/or to couple light out from waveguide 7.

In the embodiment of FIG. 2, each coupler 10a, 10b is formed by a grating 11, in particular a surface grating, which has e.g. been embossed into waveguide 7 in an intaglio-printing process. Each grating consists of a plurality of grating lines extending parallel to each other, advantageously spaced at regular intervals.

The operation of the security device of FIGS. 1 and 2 is as follows: When light is incident on one of the couplers 10a, 10b, e.g. on first coupler 10a, it is scattered by the coupler. Part of the scattered light leaves the coupler in waveguide 7 under such an angle that it is being totally reflected while it propagates along it. Only when it arrives at the location of second coupler 11, it is scattered again, such that part of it leaves waveguide 7 and can be observed by a suitable detector or by eye, depending on the wavelength of the light.

Hence, when illuminating one of the windows, e.g. first window 8a, with a light source, the second coupler located in the second window 8b will start to emit light.

In order to increase the efficiency of the device, the grating lines of the couplers 10a, 10b are perpendicular to a line connecting the couplers.

The spacing of the grating lines can either be much larger than the wavelength of the light, in which case the grating forms a plurality of classical scattering objects that give rise to scattering over an extended range of wavelengths. Alternatively, if the spacing of the grating lines is similar to or only somewhat larger than the wavelength of the light, a diffractive grating is formed, which scatters light under certain Bragg conditions only, thereby giving rise to color effects. In particular if the second grating 10b, i.e. the grating coupling light out of waveguide 7, is a diffractive grating, rainbow effects can be observed when viewing the grating from different angles.

Second Embodiment

Figure 3:
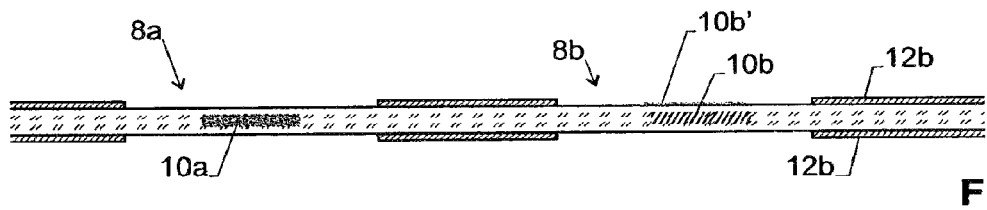
FIG. 3 shows a sectional view of a second embodiment.

FIG. 3 shows a second embodiment of a waveguide-based security device. It illustrates different types of couplers that can be used, as well as a different type of substrate.

First, in FIG. 3, substrate 1 is substantially solely formed by waveguide 7, and the paper sheets 6a, 6b have been replaced by ink layers 12a, 12b, which have e.g. been applied to both sides of waveguide 7 by means of printing techniques, such as offset print. Again, two windows 8a, 8b are formed on the document by omitting any print in the corresponding regions or by applying only ink or varnish of reduced absorbance.

In the region of first window 8a, the first coupler is formed by scattering objects embedded in (or is arranged on) waveguide 7. The scattering objects can e.g. be formed by embedding scattering particles in waveguide 7, or by locally modifying waveguide 7, e.g. by means of laser irradiation.

In the region of second window 8b, second coupler 10b is also embedded within waveguide 7 and can e.g. be formed by one or more of the following:

a) A volume hologram. Such a volume hologram can e.g. be formed within a plastics layer by means of irradiation with coherent light, using the techniques described in WO 2005/124456 (Xetos AG). Such a hologram, if arranged under appropriate angle and with appropriate grating spacing, efficiently diffracts light of a defined wavelength range out of waveguide 7, thereby giving rise to a strong, colorful effect.

b) A luminescent dye, which is luminescent under irradiation of light guided in waveguide 7. Such a dye can be embedded within waveguide 7, or, as illustrated by reference number 10b', be applied on a surface of waveguide 7, e.g. using printing techniques. If light is coupled into waveguide 7 through first coupler 10a, it will cause the dye to emit light, basically in all spatial directions, thus that the dye will glow brightly to the observer's eye.

It must be noted that, in most embodiments described here, the roles of the first and second couplers 10a, 10b can be reversed, i.e. the second coupler 10b may also be used to couple light into waveguide 7 while the first coupler 10a can also be used to couple light out of waveguide 7. For example, a volume hologram can also be used for coupling light into waveguide 7. Also, when illuminating an luminescent dye arranged on or in waveguide 7, part of the light emitted by the dye will propagate along waveguide 7 and be coupled out at the location of first coupler 10a.

Examples for suitable dyes are Macrolex red (by Bayer AG, emitting red light), or Fluorol (by Sigma-Aldrich, emitting green golden light).

The document can also be provided of dyes having at least two different luminescent colors, thereby making the effect more unique. The different colors can e.g. be arranged at distinct locations. Thus, they allow to create a multi-color image. Or they may be arranged such that, depending on where and how the light is coupled in, only one of the dyes is excited at a time.

Third Embodiment

Figure 4:
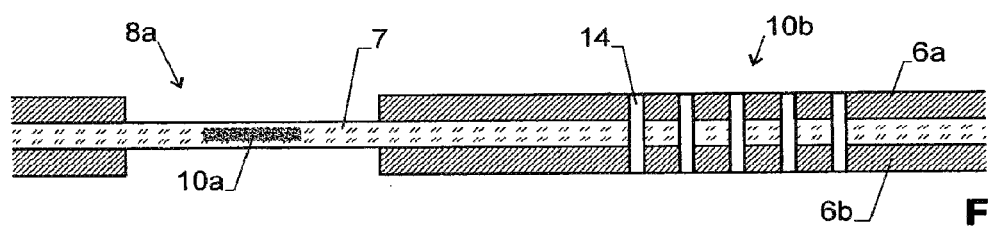
FIG. 4 shows a sectional view of a third embodiment.

Yet another embodiment is shown in FIG. 4. Here, one of the couplers, e.g. second coupler 10b, has been replaced by at least one perforation, advantageously a plurality of perforations, 14. Each perforation extends through waveguide 7 and creates an edge therein that gives rise to a scattering of the light within waveguide 7. Hence, when light is propagating along waveguide 7, part of it is scattered at the perforations 14, and the perforations 14 will start to emit light. The perforations 14 advantageously extend all the way through non-transparent substrate 1, thus that light can be emitted to both sides of the document.

The perforations can e.g. be manufactured by means of laser drilling, such as described in WO 2004/011274.

Fourth Embodiment

Figure 5:
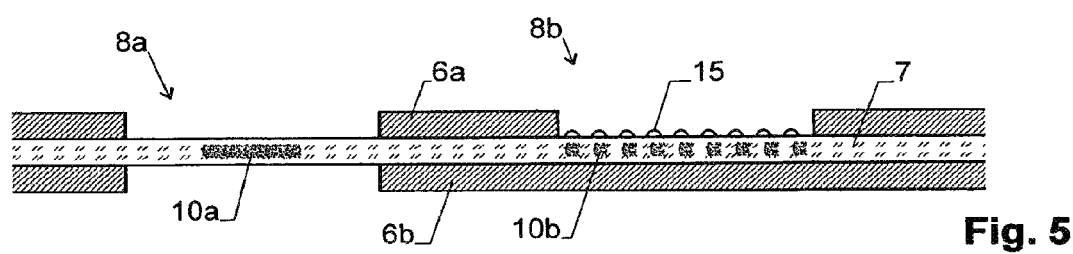
FIG. 5 shows a sectional view of a fourth embodiment.

In the embodiment of FIG. 5, second coupler 10b has a periodic structure, e.g. formed by a periodic arrangement of scattering objects or luminescent dyes. In addition, a periodic microlens-array 15 is arranged over coupler 10b, e.g. formed by separately manufacturing an array of microlenses and gluing it to second window 8b. The period of the microlenses is substantially equal to the period of the structures of coupler 10b, with "substantially equal" indicating a deviation of 10% or less. Thus, when viewing the document through the microlens-array 15 while light is propagating in waveguide 7, the interaction between coupler 10b and the microlenses will give rise to a very characteristic behavior. This behavior is even more pronounced when the periods of the lenses and the coupler 10b are slightly mismatched.

In addition, FIG. 5 illustrates that any of the windows 8a, 8b can also be a half-window, such as window 8b of FIG. 5. Using a half-window is particularly advantageous at the location where the light is coupled out because it allows to provide a defined background for coupler 10b. For example, this background can be chosen to be dark, thereby enhancing visibility of the coupled-out light. Even though the half-window is illustrated in FIG. 5 in combination with a certain type of coupler, it can also be combined with any other type of coupler.

Fifth Embodiment

Figure 6:
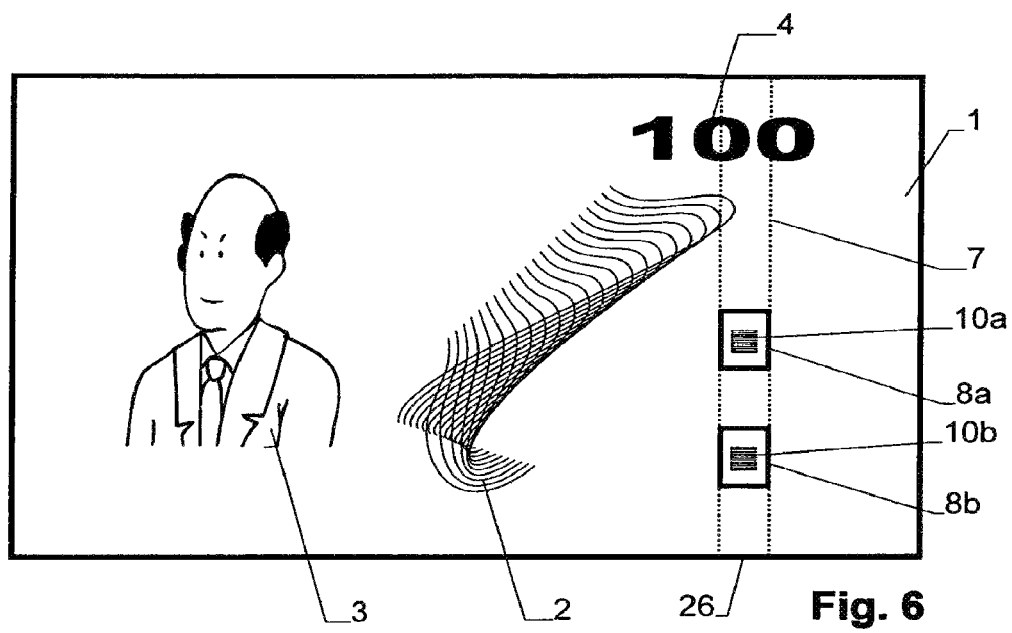
FIG. 6 shows an embodiment with a security thread.

The embodiment of FIG. 6 substantially corresponds to the one of FIG. 1. But, while in the embodiment of FIG. 1, waveguide 7 is a plastic sheet having the substantially same extension as the paper sheets 6a, 6b, in the embodiment of FIG. 6 waveguide 7 is a thin stripe embedded at least partially in substrate 1, i.e. a security thread. The security thread is visible though the windows 8a, 8b.

Figure 7:
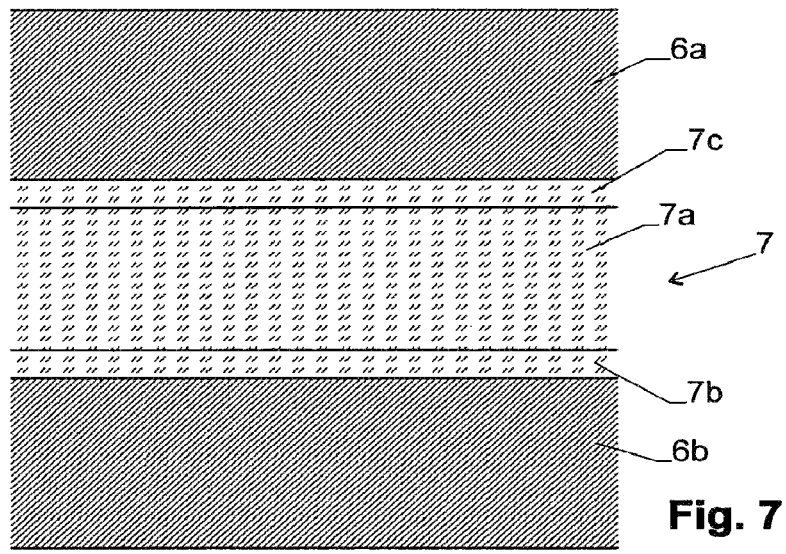
FIG. 7 shows an enlarged sectional view of a waveguide.

The Waveguide:

FIG. 7 shows a preferred structure of waveguide 7. It comprises a first layer 7a, a second layer 7b and a third layer 7c, with the first layer 7a having a higher refractive index than second and third layer 7b, 7c. The refractive index step is sufficient for constraining the guided light within first layer 7a, with only a small amount of light intensity extending into the layers 7b, 7c and practically no light extending beyond the layers 7b, 7c. As mentioned above, this design reduces losses and attenuation.

Advantageously, and as shown in FIG. 7, the layers 7b, 7c are arranged between first layer 7a and the absorbing parts of substrate 1, such as paper sheets 6a, 6b or ink layers 12a, 12b.

The waveguide can either be a monomode or multimode waveguide. However, a multimode waveguide is advantageous because it is easier to manufacture, more robust and, in the present context, has higher coupling efficiency.

Figure 8:
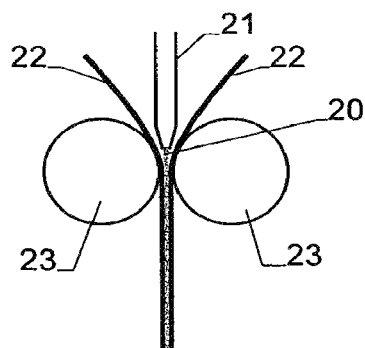
FIG. 8 shows a first method for manufacturing a waveguide.

Manufacturing the Waveguide:

FIG. 8 illustrates a first process for manufacturing a waveguide. A liquefied, thermoplastic, transparent polymer material 20 is introduced by means of a nozzle 21 between two runs of paper 22. Rollers 23 press the paper runs 22 against each other, thereby forming a layer of polymer between two layers of paper. The techniques as described in EP 2 000 321 (Lanqart AG) can be used.

In order to manufacture a system as shown in FIG. 7, where waveguide 7 consists of three layers, the paper sheets 22 can each be coated with a transparent polymer layer of low refractive index. They are introduced into the arrangement of FIG. 8 with the polymer layers facing each other. Thus, the low-refractive-index polymer layers form the layers 7b, 7c of FIG. 7, while the thermoplastic, transparent polymer material 20, which is selected to have a higher refractive index, forms layer 7a.

Figure 9:
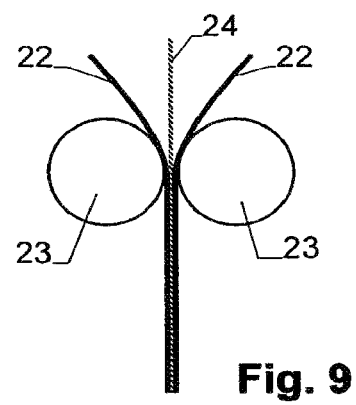
FIG. 9 shows a second method for manufacturing a waveguide.

An alternative manufacturing method is shown in FIG. 9. Here, a solid, flexible polymer foil 24 is introduced between two runs of paper 22 and laminated thereto. Again, the three layers are compressed by means of rollers 23. The bonding between foil 24 and paper runs 22 can e.g. be formed by an adhesive or by heating foil 24 for welding it against the paper. If an adhesive is used, the adhesive can again be used to form the low-refractive layers 7b, 7c of the embodiment of FIG. 7.

Notes:

As it has been mentioned, a fluorescent or luminescent dye can be used for coupling light into waveguide 7. Such a luminescent dye acts as a light source coupled to the waveguide. Apart from a luminescent dye, any other type of light source can be used as well, such as a semiconductor light source or an OLED light source integrated into the document adjacent to or within waveguide 7, as described in WO 2006/056089.

The document can also comprise a combination of two or more fluorescent or luminescent dyes for generating a color change depending on the wavelength of illumination (metameric inks).

Frequency upconverters, such as non-linear optical materials, can also be used instead of or in addition to a dye.

In most of the examples described above, two windows 8a, 8b are used as locations for the couplers 10a, 10b. However, if waveguide 7 extends all the way to the edge of substrate 1, the edge can also be used as a coupler. For example, in the embodiment of FIG. 6, waveguide 7 extends all the way to an edge 26 of substrate 1, such that light coupled in through one of the couplers 10a, 10b will become visible at edge 26.

The above description discusses various types of substrates and couplers. It must be noted that any of these substrates can be combined with any of the couplers. Also, any set of different couplers can be combined, and the invention is not limited to the specific combinations shown in the figures.

While there are shown and described presently preferred embodiments of the invention, it is to be distinctly understood that the invention is not limited thereto but may be otherwise variously embodied and practiced within the scope of the following claims.

The invention claimed is:

1. A security document comprising:
   a substrate,
   an optical waveguide arranged on and/or in said substrate, and
   at least one coupler for coupling light into said waveguide or out from said waveguide,
   wherein said security document comprises a periodic microlens-array, and
   wherein said at least one coupler has a periodic structure, with the microlens-array having a period substantially equal to said periodic structure.

2. The security document of claim 1, comprising a second coupler, wherein light coupled into said waveguide by means of said at least one coupler is at least partially transmitted to and coupled out by said second coupler.

3. The security document of claim 1, wherein said substrate is non-transparent and comprises at least one transparent window or half-window, wherein the at least one coupler is arranged in said window or half-window.

4. The security document of claim 3, wherein said substrate comprises, in addition to the at least one transparent window or half-window, a second transparent window or half-window, wherein the at least one coupler is arranged in said at least one window or half window and a second coupler is arranged in said second window or half-window, and wherein said waveguide extends between said at least one window or half-window and said second window or half-window.

5. The security document of claim 1, wherein said at least one coupler comprises a grating.

6. The security document of claim 1, wherein said at least one coupler comprises light scattering objects embedded in or arranged on said waveguide.

7. The security document of claim 1, wherein said at least one coupler comprises a fluorescent or luminescent dye arranged in or on said waveguide for coupling light into our out from said waveguide.

8. The security document of claim 7, wherein said at least one coupler comprises a plurality of luminescent dyes of at least two different luminescent colors.

9. The security document of claim 1, wherein said waveguide is embedded at least partially in the substrate.

10. The security document of claim 1, wherein said waveguide comprises at least a first layer and a second layer, with said first layer having a refractive index higher than said second layer, wherein said second layer is arranged between said first layer and an absorbing pan of said substrate.

11. The security document of claim 10, wherein said waveguide further comprises a third layer with said first layer having a refractive index higher than said third layer, and wherein said first layer is arranged between said second and third layers.

12. The security document of claim 1, further comprising a light source coupled to said waveguide.

13. The security document of claim 1, wherein said waveguide is a security thread embedded at least partially in said substrate.

14. The security document of claim 1, wherein said waveguide is a plastic foil having substantially the same size as said substrate.

15. The security document of claim 1, wherein the period of the microlens-array deviates by 10% or less from a period of the periodic structure of the coupler.

16. A security document comprising:
a substrate,
an optical waveguide arranged on and/or in said substrate, and
at least one coupler for coupling light into said waveguide or out from said waveguide,
wherein said security document comprises a periodic microlens-array, and
wherein said at least one coupler has a periodic structure, and
wherein a period of the microlens-array deviates by 10% or less from a period of the periodic structure of the at least one coupler.

* * * * *